(12) United States Patent
Park et al.

(10) Patent No.: US 11,869,512 B2
(45) Date of Patent: Jan. 9, 2024

(54) ELECTRONIC DEVICE AND CONTROL METHOD THEREFOR

(71) Applicant: SAMSUNG ELECTRONICS CO., LTD., Suwon-si (KR)

(72) Inventors: Junyong Park, Suwon-si (KR); Jiyeon Ma, Suwon-si (KR); Donghun Shin, Suwon-si (KR); Youngah Lee, Suwon-si (KR); Daewung Kim, Suwon-si (KR); Sungdo Son, Suwon-si (KR); Dahye Shim, Suwon-si (KR); Hyungmin Yook, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 202 days.

(21) Appl. No.: 17/492,267

(22) Filed: Oct. 1, 2021

(65) Prior Publication Data
US 2022/0020380 A1 Jan. 20, 2022

Related U.S. Application Data

(63) Continuation of application No. PCT/KR2020/002676, filed on Feb. 25, 2020.

(30) Foreign Application Priority Data

Apr. 2, 2019 (KR) .......................... 10-2019-0038290

(51) Int. Cl.
G10L 17/06 (2013.01)
G06F 3/0481 (2022.01)
G10L 17/22 (2013.01)

(52) U.S. Cl.
CPC ............ *G10L 17/06* (2013.01); *G06F 3/0481* (2013.01); *G10L 17/22* (2013.01)

(58) Field of Classification Search
CPC ........ G10L 17/06; G10L 17/22; G06F 3/0481
See application file for complete search history.

(56) References Cited

U.S. PATENT DOCUMENTS 9,241,257 B1  1/2016  Kim et al.
10,803,862 B2 10/2020 Jang et al.
(Continued)

FOREIGN PATENT DOCUMENTS

JP   2005-99418 A   4/2005
JP   4411590 B2     2/2010
(Continued)

OTHER PUBLICATIONS

"Participation TV", Nam June Paik Art Center, 1998, 2 pages total.
(Continued)

*Primary Examiner* — Ibrahim Siddo
(74) *Attorney, Agent, or Firm* — Sughrue Mion, PLLC

(57) ABSTRACT

An electronic device and a control method thereof are provided. The electronic apparatus includes a voice input unit, a display, a memory storing at least one instruction, and a processor configured to execute the at least one instruction. The processor is configured to: based on a voice of a user being input through the voice input unit, recognize the user who has uttered the voice by comparing the voice with a plurality of pre-registered voices; and control the display to display an indicator corresponding to the recognized user.

12 Claims, 19 Drawing Sheets

(56) References Cited

U.S. PATENT DOCUMENTS

| | | | |
|---|---|---|---|
| 2011/0270615 A1 | 11/2011 | Jordan et al. | |
| 2016/0021531 A1* | 1/2016 | Kim | H04M 1/67 |
| | | | 455/411 |
| 2016/0026426 A1* | 1/2016 | Lee | G06T 11/60 |
| | | | 345/2.2 |
| 2018/0211665 A1* | 7/2018 | Park | G10L 15/083 |
| 2019/0244619 A1 | 8/2019 | Kwon et al. | |

FOREIGN PATENT DOCUMENTS

| | | | |
|---|---|---|---|
| JP | 5636665 B2 | 12/2014 | |
| JP | 5707096 B2 | 4/2015 | |
| KR | 10-2015-0087025 A | 7/2015 | |
| KR | 10-2016-0009878 A | 1/2016 | |
| KR | 10-2018-0085931 A | 7/2018 | |
| KR | 10-2018-0117240 A | 10/2018 | |
| KR | 10-2018-0117485 A | 10/2018 | |

OTHER PUBLICATIONS

International Search Report dated Jun. 17, 2020 issued by the International Searching Authority in International Application No. PCT/KR2020/002676 (PCT/ISA/210).

International Written Opinion dated Jun. 17, 2020 issued by the International Searching Authority in International Application No. PCT/KR2020/002676 (PCT/ISA/237).

* cited by examiner

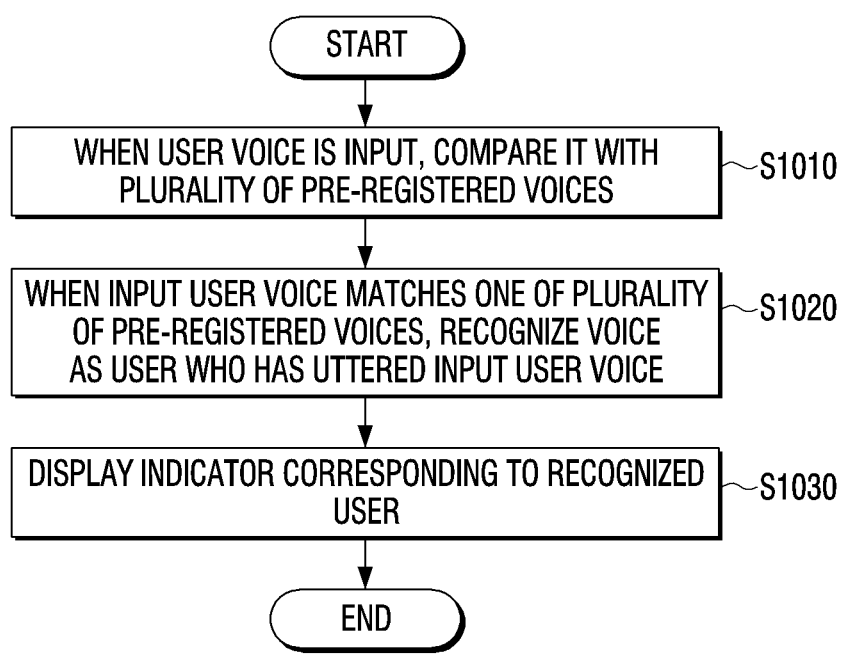

ELECTRONIC DEVICE AND CONTROL METHOD THEREFOR

CROSS-REFERENCE TO RELATED APPLICATION(S)

This application is a bypass continuation application of International PCT Application No. PCT/KR2020/002676 filed on Feb. 25, 2020, which is based on and claims priority to Korean Patent Application No. 10-2019-0038290 filed on Apr. 2, 2019 in the Korean Intellectual Property Office, the disclosure of which are incorporated by reference herein in their entireties.

BACKGROUND

1. Field

The disclosure relates to an electronic apparatus. More particularly, the disclosure relates to an electronic apparatus capable of registering an indicator corresponding to a user by analyzing a user voice and displaying an indicator corresponding to a user whose voice is recognized, and a control method thereof.

2. Description of Related Art

As electronic apparatuses in recent years have become more multifunctional and advanced, various input methods for controlling electronic apparatuses have been developed. Particularly, an input method using voice recognition that can perform various functions with only voice uttered by a user without requiring any other manual work is in the spotlight.

Voice recognition technology, which is the technical background of the input method using voice recognition, is widely used in various industries as well as in daily life, and research and demand for voice recognition technology are gradually increasing.

However, the voice recognition technology has a disadvantage in that it may be greatly affected by ambient noise or the like. Also, since a voice uttered by a user may not always be the same and may modestly change, the electronic apparatus needs to detect the difference between a pre-registered voice and a changed voice of a registered user.

Thus, voice recognition technology includes a function of, when a user voice is input to an electronic apparatus, the electronic apparatus analyzes the user voice, and transmits an analysis result and feedback to the user. Accordingly, the user may use the voice recognition technology more efficiently by utilizing the voice analysis result and feedback, such as re-registering the voice in the electronic apparatus based on the user voice analysis result.

However, in the case of the existing voice recognition input device, since there many cases that a display is not included in the device, the user has no choice but to receive the analysis result and feedback of the input voice as a notification sound.

In other words, there is a limit in that it is difficult for the user to visually check his/her voice input state and recognition state.

SUMMARY

The disclosure has been devised to solve problems described above, and an object of the disclosure is to provide an electronic apparatus for adding a display to an electronic apparatus for voice recognition, registering a user's indicator based on an input user voice, recognizing a voice uttered by the user and displaying an indicator corresponding to the recognized user, and a method for controlling the same.

In accordance with an aspect of the disclosure, there is provided an electronic apparatus including: a voice input unit; a display; a memory storing at least one instruction; and a processor configured to execute the at least one instruction to: based on a voice of a user being input through the voice input unit, recognize the user who has uttered the voice by comparing the voice with a plurality of pre-registered voices; and control the display to display an indicator corresponding to the recognized user.

The processor is further configured to, based on an event for registering the indicator being occurred, control the display to display a user interface (UI) requesting the user to utter, based on the voice including a command for registering the indicator of the user while the UI requesting an utterance from the user is displayed, analyze the voice for registering the indicator of the user to acquire the indicator corresponding to the voice, and register information on the user and the indicator and store the information and the indicator in at least one of an external server or the memory.

The UI includes a message requesting the utterance from the user and a text for switching to a voice recognition mode.

The processor is further configured to analyze pitch, loudness and quality of the voice to determine at least one of color, size, shape, position, transparency, and movement of the indicator.

The pitch and the loudness are used to determine at least one of the size, the shape, the position, and the movement of the indicator, and the quality of the voice is used to determine at least one of the color and the transparency of the indicator.

The processor is further configured to, based on the voice including a command for switching to a voice recognition mode being input, recognize the user who has uttered the voice, and based on the user who has uttered the voice being recognized, switch to the voice recognition mode.

The indicator corresponds to the user and indicates that a current mode of the electronic apparatus is the voice recognition mode.

The processor is further configured to, based on the voice being input through the voice input unit during the voice recognition mode, change the indicator to correspond to an analysis result of the voice.

The processor is further configured to change at least one of color, size, shape, position, transparency, and movement of a pre-registered indicator by analyzing the pitch, loudness and quality of the voice input through the voice input unit during the voice recognition mode.

The processor is further configured to control the display to display a message requesting a command from the user at a same time as the indicator is registered.

In accordance with an aspect of the disclosure, there is provided a method for controlling an electronic apparatus. The method includes: based on a voice of a user being input, recognizing the user who has uttered the voice by comparing the voice with a plurality of pre-registered voices; and displaying an indicator corresponding to the recognized user.

The registering the indicator includes, based on an event for registering the indicator being occurred, displaying a user interface (UI) requesting the user to utter; based on the voice including a command for registering the indicator of the user while the UI requesting an utterance from the user is displayed, analyzing the voice for registering the indicator of the user to acquire the indicator corresponding to the voice; and registering information on the user and the indicator and store the information and the indicator in at least one of an external server or the memory.

The UI includes a message requesting the utterance from the user and a text for switching to a voice recognition mode.

The acquiring the indicator includes analyzing pitch, loudness and quality of the voice to determine at least one of color, size, shape, position, transparency, and movement of the indicator.

The pitch and the loudness are used to determine at least one of the size, the shape, the position, and the movement of the indicator, and the quality of the voice is used to determine at least one of the color and the transparency of the indicator.

As described above, according to various embodiments of the disclosure, the electronic apparatus may analyze an input voice, recognize a user who has uttered the input voice, and display a pre-registered indicator corresponding to the recognized user, thereby allowing the user to be provided with a voice input state.

BRIEF DESCRIPTION OF THE DRAWINGS

FIG. 10 is a flowchart illustrating a method for controlling an electronic apparatus according to an embodiment.

DETAILED DESCRIPTION

Figure 1:
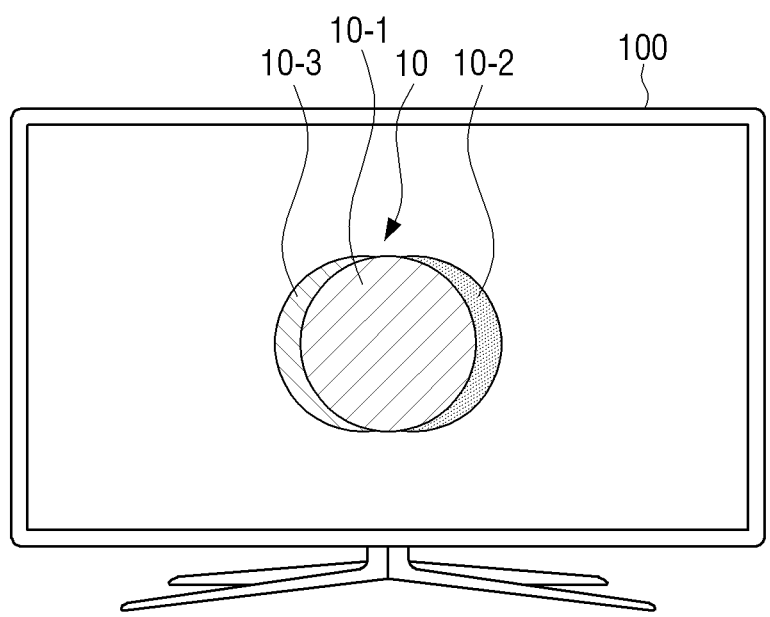
FIG. 1 is a view illustrating an electronic apparatus displaying an indicator according to an embodiment.

In the following description, same drawing reference numerals are used for the same elements even in different drawings. In the following description, well-known functions or constructions may not be described in detail if they would obscure the invention in unnecessary detail. Further, dimensions of various elements in the accompanying drawings may be arbitrarily selected for assisting in a comprehensive understanding.

In the description of the disclosure, the order of each step should be understood as non-limiting unless a preceding step is to be logically and temporally performed before a subsequent step. In other words, except for exceptional cases described above, even if the process described as a subsequent step is performed before the process described as the preceding step, an essence of the disclosure is not affected, and the scope of the disclosure should also be defined regardless of the order of the steps.

In the disclosure, expressions such as "has", "may have" "includes" or "may include" refer to the corresponding features (e.g., numerical value, function, operation, or component such as a part), and does not exclude the presence of additional features.

In the disclosure, components necessary for the description of each embodiment of the disclosure are described, and thus the disclosure is not necessarily limited thereto. Accordingly, some components may be changed or omitted, and the other components may be added. In addition, they may be distributed and arranged in different independent devices.

Certain example embodiments will now be described in greater detail with reference to the accompanying drawings.

FIG. 1 is a view illustrating an electronic apparatus 100 displaying an indicator according to an embodiment. As illustrated in FIG. 1, the electronic apparatus 100 may determine an indicator 10 including a plurality of layers 10-1, 10-2, and 10-3 based on an input user voice.

The electronic apparatus 100 may determine and register an indicator corresponding to the user voice based on the user voice input through a voice input unit 110 and store it in at least one of a memory 120 or an external server. Specifically, when an event for registering an indicator 10 occurs, the electronic apparatus 100 may display a UI requesting the user to speak. When a user voice is input while a UI requesting a user to utter is displayed, the electronic apparatus 100 may analyze the user voice and determine the indicator 10 corresponding to the user voice. Specifically, the electronic apparatus 100 may analyze the user voice input through the voice input unit 110, and determine the indicator 10 according to the analyzed characteristics of the user voice (e.g., pitch, loudness and sound quality of the voice). As an example, the electronic apparatus 100 may determine the number of layers constituting the indicator and various characteristics (e.g., color, size, shape, position, transparency, and movement) by analyzing the characteristics of the input user voice. Therefore, the plurality of layers 10-1, 10-2, and 10-3 constituting the indicator 10 is merely an example, and may be variously configured. In addition, the electronic apparatus 100 may register the determined indicator 10 and store user information and the indicator 10 corresponding to the user in at least one of the external server or the memory 120.

Also, when a user voice is input through the voice input unit 110, the electronic apparatus 100 may recognize the user who has uttered the input voice. Specifically, when a user voice includes commands for switching to a voice recognition mode through the voice input unit 110, the electronic apparatus 100 may compare a plurality of pre-registered voices with the input voice and recognize the user who has uttered the voice. Also, when the user who uttered the input voice is recognized, the electronic apparatus 100 may switch the mode of the electronic apparatus 100 to the voice recognition mode. When the mode of the electronic apparatus 100 is the voice recognition mode, the electronic apparatus 100 may display a plurality of objects 810 indicating whether a loudness of the user voice correspond to the indicator 10, user information, and the loudness of the user voice can be detected by the voice input unit 110.

In addition, the electronic apparatus 100 may control a display 130 to display a registered indicator 10 corresponding to the recognized user. Specifically, as illustrated in FIG. 1, the electronic apparatus 100 may display the indicator 10 to indicate that the mode of the electronic apparatus 100 is the voice recognition mode. Also, when a user voice is input during the voice recognition mode, the electronic apparatus 100 may change the indicator 10 to correspond to an analysis result of the input user voice. For example, in the voice recognition mode, when there is a difference between the inputted user voice and a pre-registered user voice, the electronic apparatus 100 may change characteristics of the plurality of layers 10-1, 10-2, and 10-3 of the indicator 10 by analyzing the difference between the input user voice and the pre-registered user voice.

While in the voice recognition mode, the electronic apparatus 100 may simultaneously display a message requesting a command from the user with the indicator 10 corresponding to the user voice. In other words, the electronic apparatus 100 may control the display 130 to display a text corresponding to the voice uttered by the user on the electronic apparatus 100 in order to identify the voice command uttered by the user. Accordingly, the user may give various commands to the electronic apparatus 100 by voice in the voice recognition mode.

Figure 2:
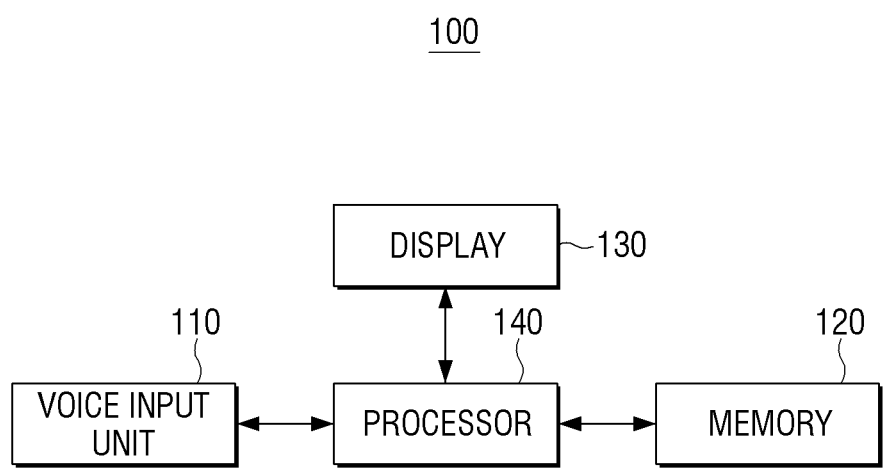
FIG. 2 is a block diagram schematically illustrating an electronic apparatus according to an embodiment.

FIG. 2 is a block diagram schematically illustrating an electronic apparatus 100 according to an embodiment. As illustrated in FIG. 2, the electronic apparatus 100 may include a voice input unit 110, a memory 120, a display 130, and a processor 140. However, the embodiment is not limited to thereto, and some configurations may be added or omitted depending on the type of the electronic apparatus.

The voice input unit 110 may be a microphone configured to receive a user voice. Particularly, the voice input unit 110 may receive a user utterance including text for switching to the voice recognition mode and may receive a voice containing the user's command.

In addition, the voice input unit 110 may be provided inside the electronic apparatus 100, but may be provided outside and electrically connected to the electronic apparatus 100 or may be communicatively connected through the communicator 150.

The memory 120, for example, may store an instruction or data regarding at least one of the other elements of the electronic apparatus 100. The memory 120 may be implemented as a non-volatile memory, a volatile memory, a flash memory, a hard disk drive (HDD) or a solid state drive (SDD). The memory 120 may be accessed by the processor 140, and perform readout, recording, correction, deletion, update, and the like, on data by the processor 140. According to an embodiment of the disclosure, the term storage may include the memory 120 including read-only memory (ROM) (not illustrated) and random access memory (RAM) (not illustrated) within the processor 140, and a memory card (not illustrated) attached to the electronic apparatus 100 (e.g., micro secure digital (SD) card or memory stick). Also, the memory 120 may store program, data, and the like for constituting various types of screens that will be displayed in the display area of the display 130.

In addition, the memory 120 may store an indicator and user information corresponding to the user voice input from the voice input unit 110. Specifically, the memory 120 may store the indicator and user information acquired by analyzing the voice for registering the indicator of the user input by the electronic apparatus 100. The user information stored in the memory 120 may include a user voice, voice characteristics (e.g., voice strength, pitch, and sound quality), user name, age, and gender, however the one or more embodiments are not limited thereto.

The display 130 may display various information under the control of the processor 140. Particularly, the display 130 may display a user interface (UI) including a message requesting a user utterance of text for switching to the voice recognition mode. Also, the display 130 may display a screen indicating a registered indicator corresponding to the recognized user and a voice recognition mode switched according to user recognition.

Also, the display 130 may be implemented as a touch screen with a touch panel. However, it is not limited to the embodiment described above, and the display 130 may be implemented differently depending on the type of the electronic apparatus.

The processor 140 may be electrically connected to the memory 120 and the display 130 to control overall operations and functions of the electronic apparatus 100. Particularly, when a user voice is input through the voice input unit 110, the processor 140 may recognize the user who has uttered the input voice and control the display 130 to display an indicator corresponding to the recognized user.

In addition, when an event for registering the indicator occurs, the processor 140 may control the display 130 to display a UI requesting the user to utter. Also, when a voice for registering the user's indicator is input through the voice input unit 110 while the UI requesting utterance is displayed, the processor 140 may analyze the user voice to acquire an indicator corresponding to the user voice and register information about the user and store the indicator and the register information in an external server or the memory 120. Particularly, the UI requesting utterance may include a message requesting user utterance for text for switching to the voice recognition mode.

Also, the processor 140 may determine characteristics of a plurality of layers constituting the indicator by analyzing the characteristics of the user voice. Specifically, the processor 140 may analyze pitch, loudness, and quality of the user voice to determine color, size, shape, position, transparency, and movement of a plurality of layers constituting the indicator. In an embodiment, the processor 140 may determine at least one of the size, shape, position, and movement of the layer constituting the indicator by analyzing the pitch and loudness of the user voice, and analyze the sound quality to determine at least one of the color and transparency of the layer constituting the indicator.

When the user voice including text for switching to the voice recognition mode is input through the voice input unit 110, the processor 140 may recognize the user who has uttered the input voice, and switch to the voice recognition mode when the user who uttered the input voice is recognized. Specifically, the processor 140 may analyze the input user voice and compare an analysis result with an analysis result of a pre-registered user voice and determine whether the user who has uttered the voice is a pre-registered user.

In addition, in the voice recognition mode, the processor 140 may recognize the voice uttered by the user and change the indicator to correspond to the analysis result of the input user voice. Specifically, the processor 140 may analyze the pitch, loudness, and sound quality of the user voice input through the voice input unit 110 during the voice recognition mode to change at least one of color, size, shape, position, transparency, and movement of a plurality of layers constituting the pre-registered indicator.

In addition, the processor 140 may control the display to display a message requesting a command to the user at the same time as the registered indicator. When the user inputs an utterance including a command into the electronic apparatus 100 through the voice input unit 110, the processor 140 may control the display 130 to display a text corresponding to the voice uttered by the user on the electronic apparatus 100 in order to identify the voice command uttered by the user. In addition, the processor 140 may perform a function corresponding to the user command.

Figure 3:
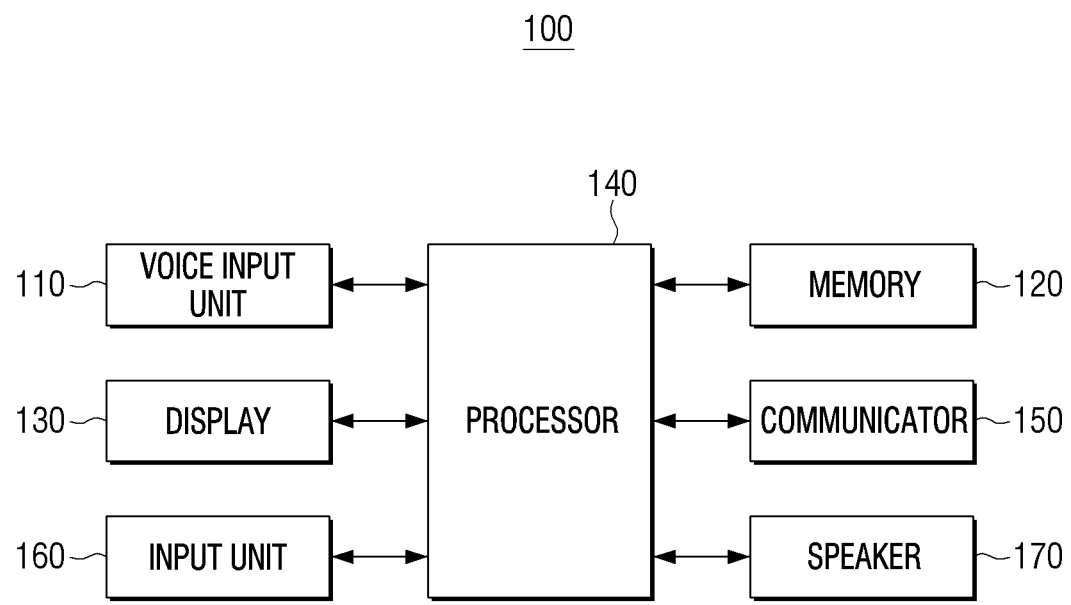
FIG. 3 is a block diagram illustrating an electronic apparatus in detail according to an embodiment.

FIG. 3 is a block diagram illustrating the electronic apparatus 100 in detail according to an embodiment. As illustrated in FIG. 3, the electronic apparatus 100 may include a voice input unit 110, a memory 120, a display 130, a processor 140, a communicator 150, an input unit 160, and a speaker 170. Here, since the voice input unit 110, the memory 120, the display 130, and the processor 140 illustrated in FIG. 3 have been described with respect to FIG. 2, the overlapping description thereof will be omitted.

The communicator 150 may communicate with an external device. For example, a communication connection of the communicator 150 with the external device may include communication through a third device (e.g., a repeater, a hub, an access point, a server, a gateway, or the like).

Particularly, the communicator 150 may communicate with an external device, such as a remote controller of the electronic apparatus 100, a smartphone, an AI speaker or the like to receive a user voice input through a microphone of the external device. In an embodiment, when a voice for registering the user's indicator is input to a microphone of the remote controller of the electronic apparatus 100, the communicator 150 may receive a signal including the user voice from the remote controller.

The communicator 150 may include various communication modules to communicate with an external device. The communicator 150, for example, may include a cellular communication using at least one among long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communications (GSM). Furthermore, wireless communication module may include at least one of, for example, wireless fidelity (Wi-Fi), Bluetooth, Bluetooth Low Energy (BLE), ZigBee, near field communication (NFC), Magnetic Secure Transmission, radio frequency RF, or body area network BAN. In addition, the communicator 150 may include at least one of, for example, universal serial bus (USB), high definition multimedia interface (HDMI), recommended standard232 (RS-232), power line communication, or plain old telephone service (POTS). A network in which wireless communication or wired communication is performed may include at least one of a telecommunication network, for example, a computer network (e.g., LAN or WAN), the Internet, or a telephone network.

The input unit 160 may receive a user input for controlling the electronic apparatus 100. Particularly, the input unit 160 may include a touch panel for receiving a user touch input by a user's hand or a stylus pen or the like, and/or a button for receiving a user manipulation or the like. In addition, the input unit 160 may be implemented as the other input device (e.g., a remote controller, a motion input unit, a virtual keyboard, or a mouse). In one embodiment, the user may input an event for registering an indicator by pressing a voice recognition button of the remote controller. In addition, the user may change an image or text constituting a voice recognition mode by using a virtual keyboard.

The speaker 170 is configured to output not only various audio data on which various processing tasks such as decoding, amplification, and noise filtering have been performed by an audio processing unit, but also various notification sounds or voice messages. Specifically, a configuration for outputting an audio may be implemented to be speaker 170, this is merely one of various embodiments of the disclosure. It may be implemented to be output component that can output the audio data.

The processor 140 may include one or more among a central processing unit (CPU), a micro controller unit (MCU), a micro processing unit (MPU), a controller, and an application processor (AP) for processing a digital signal, or a communication processor (CP), an ARM processor, or may be defined by a corresponding term. In addition, the processor 140 may be implemented as a system on chip (SoC), large scale integration (LSI), or a field programmable gate array (FPGA) having a built-in processing algorithm. The processor 140 may perform various functions by executing computer executable instructions stored in the memory 120. In addition, the processor 140 may include at least one of AI-dedicated processors such as graphics-processing unit (GPU), Neural Processing Unit (NPU), Visual Processing Unit (VPU).

Figure 4A:
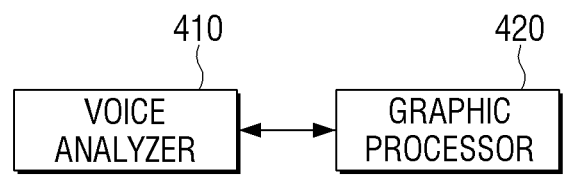
FIG. 4A is a block diagram illustrating an electronic apparatus that analyzes a user voice and acquires an indicator based on an analysis result, according to an embodiment.
Figure 4B:
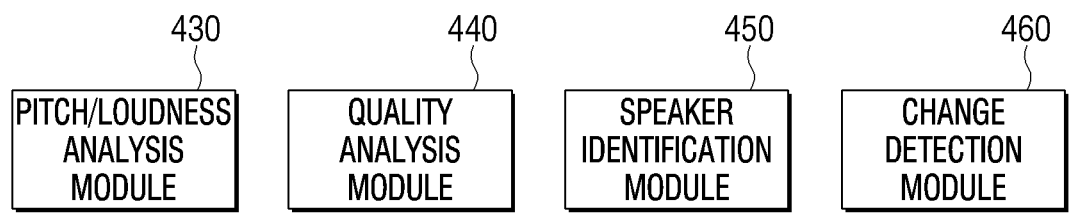
FIG. 4B is a block diagram illustrating an electronic apparatus that analyzes a user voice according to an embodiment.

FIGS. 4A and 4B are block diagrams illustrating an electronic apparatus that analyzes a voice and acquires an indicator based on a result of the analysis, according to an embodiment. As illustrated in FIG. 4A, the electronic apparatus 100 may include a voice analyzer 410 that analyzes the user voice input through the voice input unit 110, recognize the user who has uttered the input user voice and detect a change in the uttered voice.

As illustrated in FIG. 4B, the voice analyzer 410 may analyze the voice through a pitch/loudness analysis module 430, a quality analysis module 440, a speaker identification module 450, and a change detection module 460.

The pitch/loudness analysis module 430 may analyze the pitch and loudness of the user voice input through the voice input unit 110. Pitch refers to a degree of highness or lowness of a tone and is determined by the number of vibrations per second. For example, sound pitch of an average male is 118 Hz and sound pitch of an average female is 211 Hz. In an embodiment, the electronic apparatus 100 may classify the gender of a person who uttered by analyzing the pitch. Loudness refers to a magnitude of a sound wave and may be determined by a width of voice vibration. The loudness of the inputted user voice may vary according to a state of the voice input unit 110 or a distance from which the user speaks.

The sound quality analysis module 440 may analyze the sound quality of the user voice input through the voice input unit 110. In other words, the sound quality analysis module 440 may analyze a frequency variability rate (Jitter), amplitude variability (Shimmer), and noise of the voice. The frequency variability rate refers to how much the pitch of the voice changed in an analysis section. The amplitude variability refers to how much the voice loudness changed in the analysis section. The noise refers to a degree to which vocal cord vibration and breathing are irregular, and an irregular state, that is, a state in which sound is large, means a state in which both the frequency and amplitude variability rates are high. As an embodiment, when values of the frequency variability rate, the amplitude variability, and the noise are large, the sound quality analysis module 440 may identify that an emotional change of the user who has uttered the voice is large. In other words, the sound quality analysis module 440 may analyze the sound quality and determine a change in the user's emotion.

The speaker identification module 450 may identify whether the uttered user voice is a pre-registered user voice based on the user voice analysis result. In other words, when the user voice is input through the voice input unit 110, the speaker identification module 450 may identify that the uttered user voice is a registered user voice by comparing it with a plurality of pre-registered voices. For example, the speaker identification module 450 may analyze characteristics of the user voice input through the voice input unit 110 (e.g., pitch, loudness, and sound quality) and match them with the pre-registered plurality of users. When a difference between the characteristics of the input user voice and the characteristics of the registered user voice does not exceed a threshold value, the speaker identification module 450 identifies that the input voice was uttered by the pre-registered user. Accordingly, the speaker identification module 450 may recognize the user who has uttered the voice.

When the electronic apparatus 100 is in the voice recognition mode, the change detection module 460 may detect that the analysis result of the user voice input through the voice input unit 110 is different from the existing analysis result. In other words, since the voice uttered by the user is not always the same and may change slightly, the change detection module 460 may detect a difference in the user voice while in the voice recognition mode.

Moreover, a graphic processor 420 illustrated in FIG. 4A may determine components of the indicator based on the analysis result through the voice analyzer 410. The graphic processor 420 may analyze pitch, loudness, and sound quality of the user voice to determine the number of layers constituting the indicator and color, size, shape, position, transparency, movement, or the like of the plurality of layers. In this case, the graphic processor 420 may determine the size, shape, position, and movement of the indicator by analyzing the pitch and loudness, and may determine the color and transparency of the indicator by analyzing the sound quality. In an embodiment, the graphic processor 420 may increase a size of the layer of the indicator based on an analysis result that the pitch and loudness values of the user voice are large. Also, in an embodiment, the graphic processor 420 may determine the color of the indicator to be red or dark as a result value corresponding to the analysis of the sound quality of the user voice is greater. However, this is only an example, and the graphic processor 420 may determine the color, size, shape, position, transparency, and movement of the indicator based on the result of voice analysis in various ways.

Figure 5:
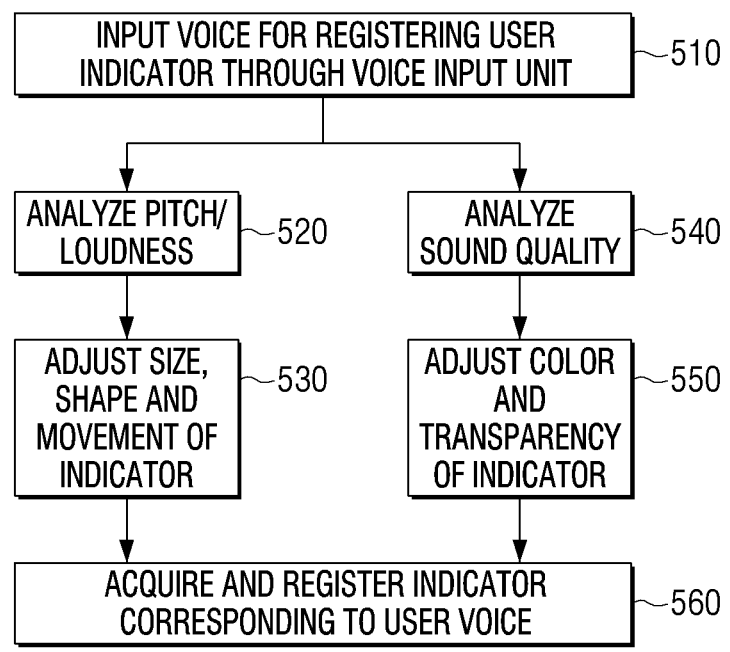
FIG. 5 is a flowchart illustrating a process in which an electronic apparatus acquires an indicator based on a user voice according to an embodiment.

FIG. 5 is a block diagram illustrating a process in which an electronic apparatus acquires an indicator based on a user voice according to an embodiment.

The electronic apparatus 100 may receive a voice for registering the user's indicator from the user through the voice input unit 110 (510). The electronic apparatus 100 may analyze the pitch and loudness of the received user voice (520). The electronic apparatus 100 may adjust size, shape, position, and movement of the indicator in response to the analyzed values of the pitch and loudness of the user voice (530). According to an embodiment, the electronic apparatus 100 may increase the size of the indicator as the pitch and loudness analysis values of the input user voice increase. In addition, the electronic apparatus 100 may make the shape of the indicator more angular and position the indicator in an upper region of the display 130 as the pitch and loudness analysis values of the input user's voice becomes greater. In addition, the electronic apparatus 100 may increase a moving speed of the indicator as the pitch and loudness analysis values of the input user voice increase. However, this is only an example, and the electronic apparatus 100 may determine the indicator in various ways according to the result of analyzing the pitch and loudness of the user voice. The electronic apparatus 100 may analyze the sound quality of the received user voice (540). The electronic apparatus 100 may adjust the color and transparency of the indicator in response to the analyzed sound quality of the user voice (550). In an embodiment, as the value of the frequency variability rate and the amplitude variability rate of the sound quality of the input user voice increases, the electronic apparatus 100 may make the color of the indicator red. Also, in one embodiment, when analyzing the sound quality of the input user voice, as a degree of irregularity (i.e., noise) of vocal cord vibration and breathing increases, the electronic apparatus 100 may darken a brightness of the indicator and lower a transparency of the indicator. As a result, the electronic apparatus 100 may acquire and register an indicator corresponding to the user voice (560). In addition, the electronic apparatus 100 may store the registered indicator and user information in the external server or the memory 120.

Figure 6:
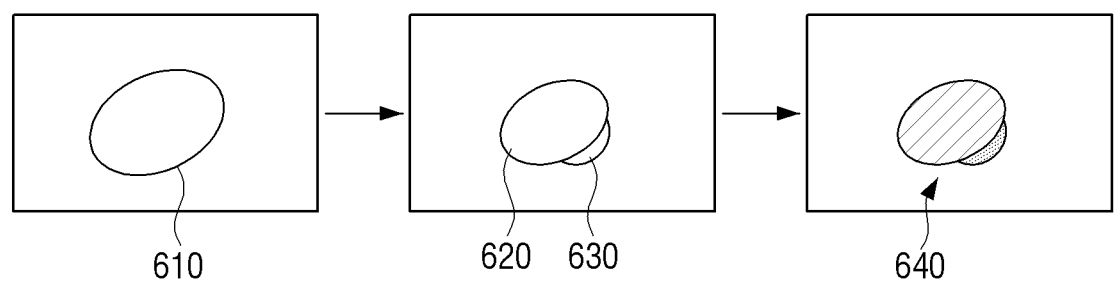
FIG. 6 is a view illustrating a process in which an electronic apparatus determines an indicator according to an embodiment.

FIG. 6 is a view illustrating a process in which an electronic apparatus determines an indicator, according to an embodiment.

The indicator may maintain a shape of a layer 610 having a predetermined size of a black and white tone before the electronic apparatus 100 receives a user voice for registering the indicator of the user. When the user voice is input through the voice input unit 110, the electronic apparatus 100 may analyze the inputted user voice and determine an indicator based on the analysis result. Particularly, the electronic apparatus 100 may adjust the size, shape, position, and movement of the indicator based on a result of analyzing the pitch and loudness of the user voice. In an embodiment, as the result of analyzing the pitch of the user voice increases, the electronic apparatus 100 may increase a size of a first layer 620 of the indicator. Similarly, as an example, as the result of analyzing the loudness of the user voice increases, the electronic apparatus 100 may increase a size of a second layer 630 of the indicator. And, according to an embodiment, the electronic apparatus 100 may differently determine colors of a plurality of layers 640 of the indicator based on the result of analyzing the sound quality of the user voice.

The electronic apparatus 100 may allow the user to determine characteristics of the indicator, such as a color constituting the indicator, before determining the indicator corresponding to the user. In other words, when determining the indicator corresponding to the user, the electronic apparatus 100 may reflect an opinion of the user.

FIGS. 7A to 7D are views illustrating a process in which the electronic apparatus 100 registers an indicator corresponding to a voice for registering a user's indicator, according to an embodiment.

Figure 7A:
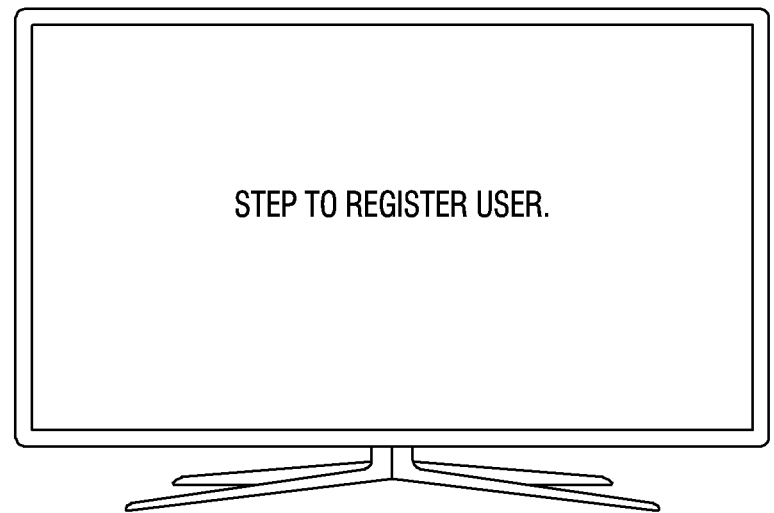
FIG. 7A is a view illustrating a UI that displays an indicator to register a user, according to an embodiment.
Figure 7A:
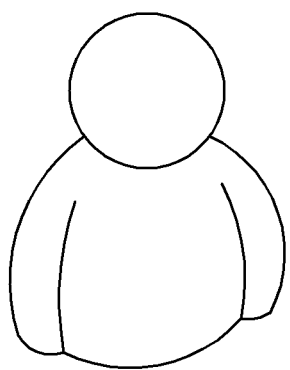

FIG. 7A is a view displaying a UI for illustrating that the electronic apparatus 100 may register an indicator to a user, according to an embodiment. When an event for registering an indicator occurs, the electronic apparatus 100 may control the display 130 to display a UI including a message requesting the user to speak. According to an embodiment, an event for registering the indicator may be an event of pressing a button for registering an indicator attached to the display 130 or the remote controller, an event that a voice uttering a specific text is inputted through the voice input unit 11, an event of power-on for the first time after released in factory, or an event of selecting a menu for registering an indicator. This is only an example, and events for registering the indicator may be various.

In addition, when an event for registering the indicator occurs, the electronic apparatus 100 may display a UI including a text "Step to register a user". However, this is only an example, and the electronic apparatus 100 may display a UI including various texts or user-defined images implying that the indicator can be registered.

Figure 7B:
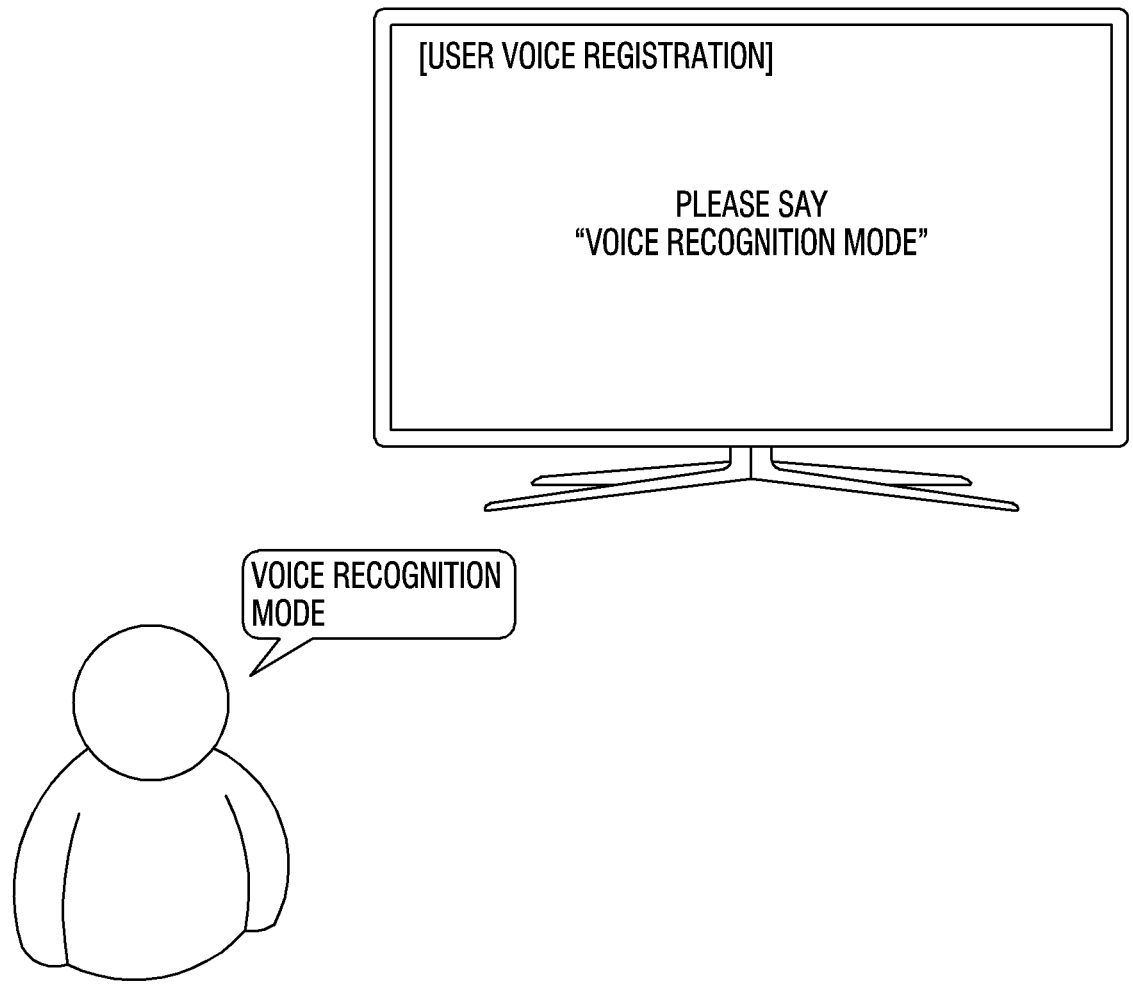
FIG. 7B is a view illustrating a UI requesting an utterance to a user for indicator registration, according to an embodiment.

FIG. 7B is a view illustrating a UI for requesting an utterance to a user for registering an indicator, according to an embodiment. The electronic apparatus 100 may display a UI including a message requesting a user utterance of text for switching to a voice recognition mode. When the user's utterance of text for switching from the user to the voice recognition mode is input, the electronic apparatus 100 may analyze characteristics (e.g., pitch, loudness, and sound quality) of the user voice, and store the analyzed characteristics in at least one of the memory 120 or an external server. In an embodiment, the electronic apparatus 100 may determine the size, shape, position, and movement of the indicator based on the pitch and loudness of the input user voice, and determine the color and transparency of the indicator based on the input sound quality of the user. In addition, the electronic apparatus 100 may store the determined indicator in at least one of the memory 120 or an external server.

Figure 7C:
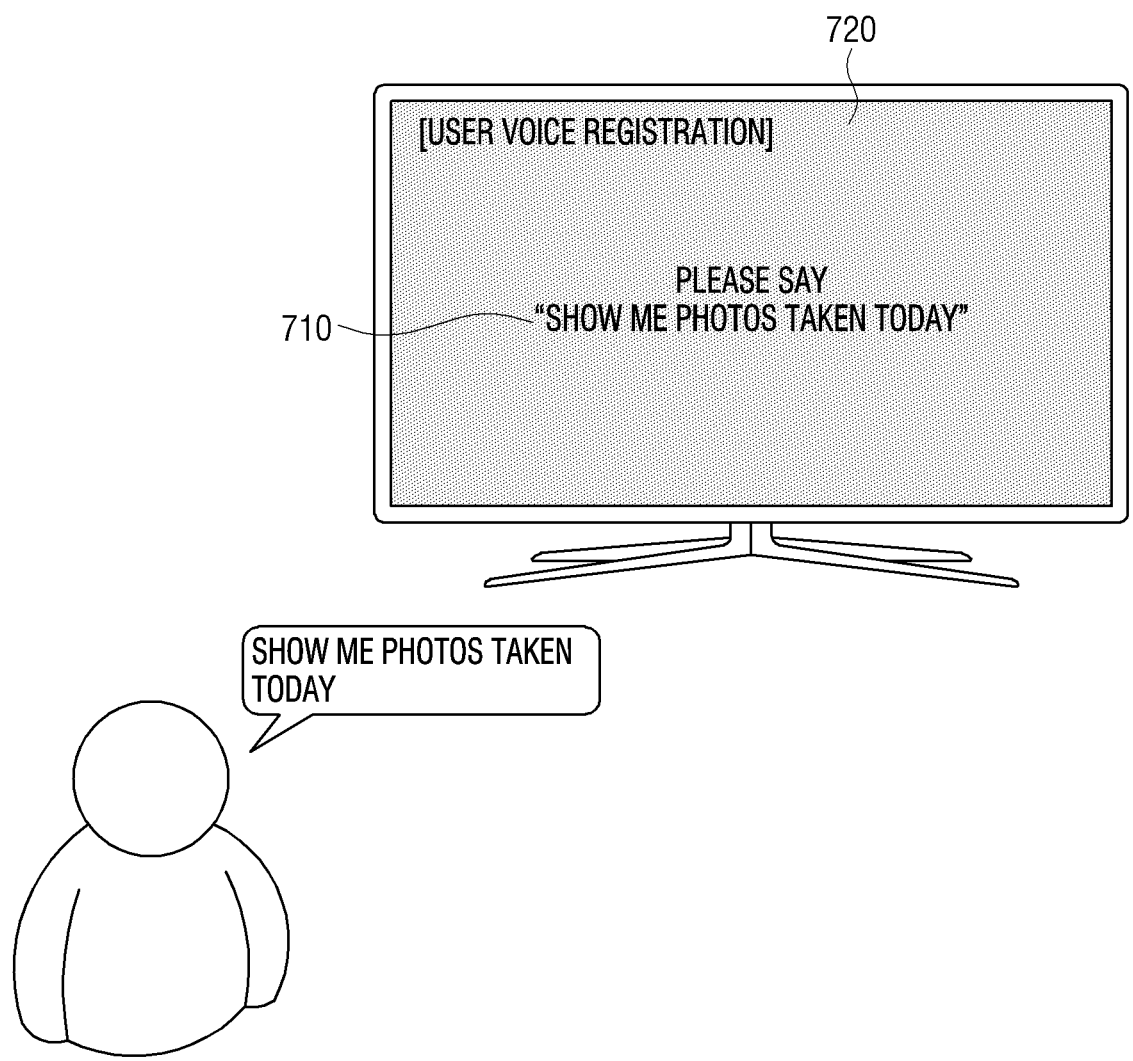
FIG. 7C is a view illustrating a UI requesting an utterance to a user for indicator registration, according to an embodiment.
Figure 7D:
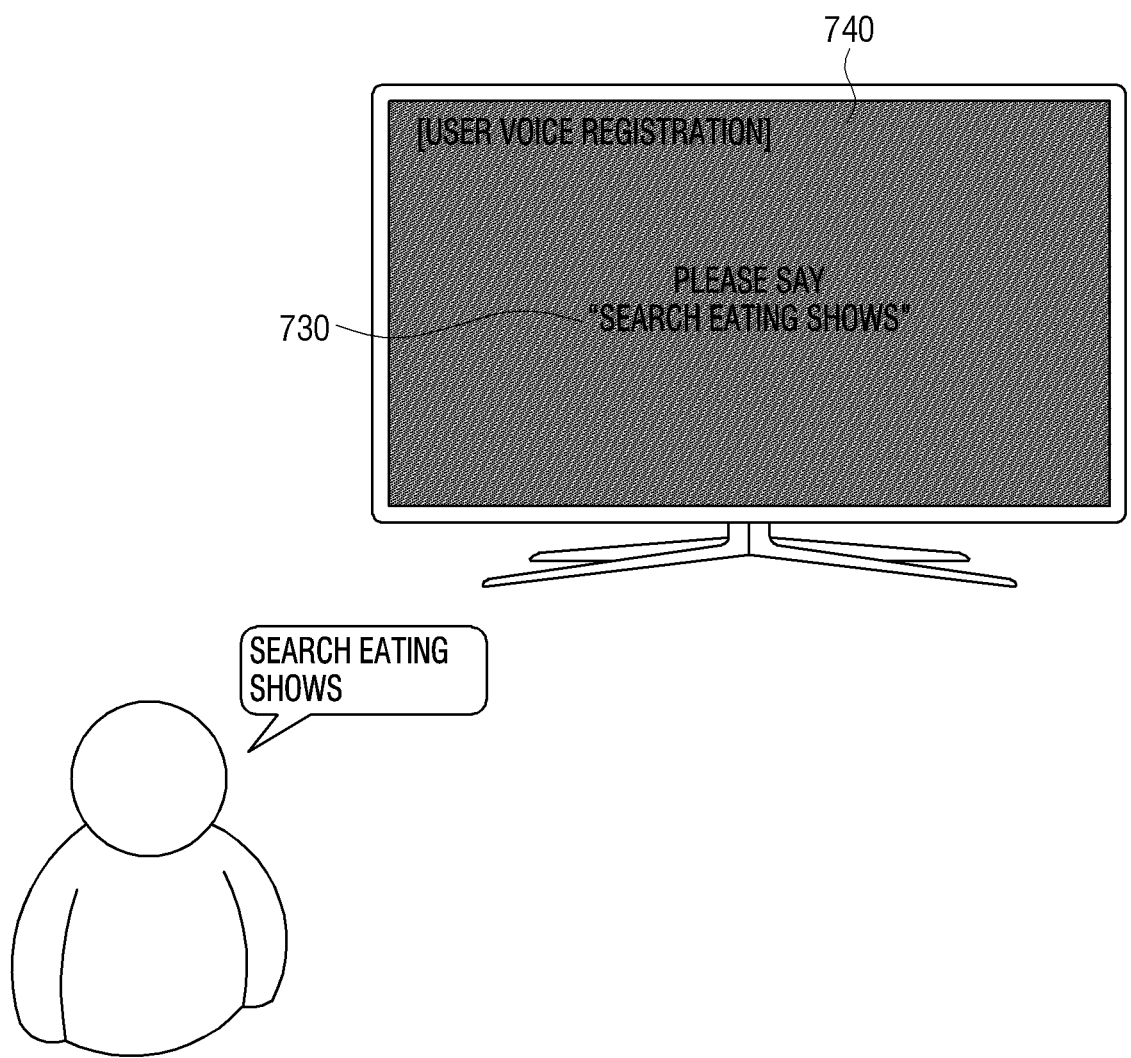
FIG. 7D is a view illustrating a UI requesting an utterance to a user for indicator registration, according to an embodiment.

FIGS. 7C and 7D are views illustrating a UI requesting an utterance from a user for indicator registration according to an embodiment. As illustrated in FIG. 7C, the electronic apparatus 100 may display a UI including a text 710 among a plurality of pre-stored texts as well as a text for switching to the voice recognition mode and a message requesting a user utterance of the text 710. In addition, when the UI including one of the plurality of pre-stored texts 710 and the message requesting the user utterance for the text 710 is displayed, and a voice with respect to the displayed text is inputted from the user, the electronic apparatus 100 may determine an indicator corresponding to the user voice by analyzing characteristics of the input voice. However, if the analyzed characteristics of the user voice are not sufficient to determine the indicator corresponding to the user voice, the electronic apparatus 100 may again display the UI including one of a plurality of pre-stored texts 730 and the message requesting the user utterance for the text 730. Accordingly, until an indicator corresponding to the user voice is determined by analyzing the characteristics of the voice input from the user, the electronic apparatus 100 may repeatedly display one of the plurality of pre-stored texts and the UI including the message requesting the user utterance for the text.

According to an embodiment, as illustrated in FIGS. 7C and 7D, the electronic apparatus 100 may indicate a degree to which the indicator corresponding to the user voice is determined through a brightness of a background color. Specifically, as illustrated in FIG. 7C, when the analyzed characteristics of the user voice are not sufficient to determine the indicator corresponding to the user voice, the electronic apparatus 100 may redisplay the UI including one 710 of a plurality of pre-stored texts and a message requesting a user utterance for the text 710, and make a brightness of a background color 720 higher or lower than a brightness from the previous background color by a predetermined value. Moreover, when the analyzed characteristics of the user voice are not sufficient to determine the indicator corresponding to the user, as illustrated in FIG. 7D, the electronic apparatus 100 may redisplay the UI including one 730 of a plurality of pre-stored texts and a message requesting a user utterance for the text 730, and make a brightness of a background color 740 higher or lower by a predetermined value. Accordingly, the electronic apparatus 100 may visually indicate a degree to which the indicator corresponding to the user voice is determined through a brightness of the background color.

Figure 7E:
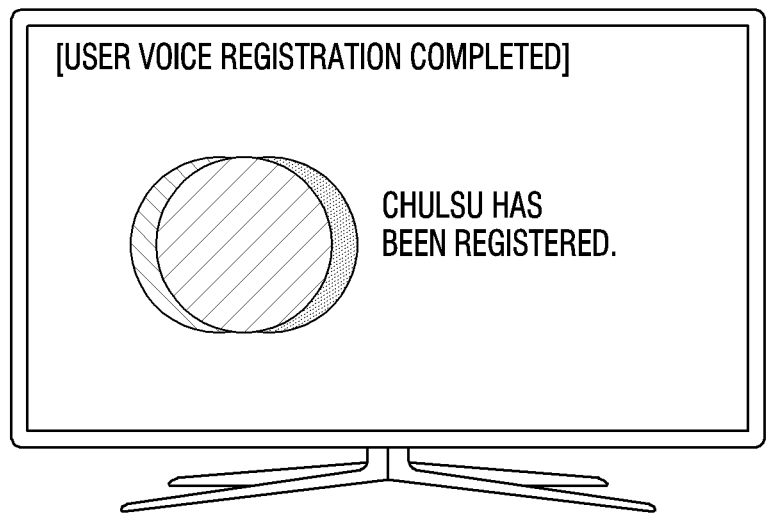
FIG. 7E is a view illustrating a UI in which an electronic apparatus notifies a user that an indicator has been registered, according to an embodiment.

FIG. 7E is a view illustrating a UI in which the electronic apparatus 100 notifies a user that an indicator has been registered, according to an embodiment. The electronic apparatus 100 may register user information together with an indicator corresponding to the user voice. According to an embodiment, the user may input his/her information into the electronic device 100 in advance through the voice input unit 110 or the input unit 160 before or after uttering text for switching to the voice recognition mode. As illustrated in FIG. 7E, according to an embodiment, the electronic apparatus 100 may display an indicator corresponding to text "Chulsu has been registered" and an indicator corresponding to the user voice to display a UI notifying the user that the indicator has been registered.

In addition, the UI for registering the indicator illustrated in FIGS. 7A to 7E may be simultaneously displayed with a screen displayed before an event for registering the indicator. In addition, the UI for registering the indicator may be displayed in one area or the entire screen.

Figure 8A:
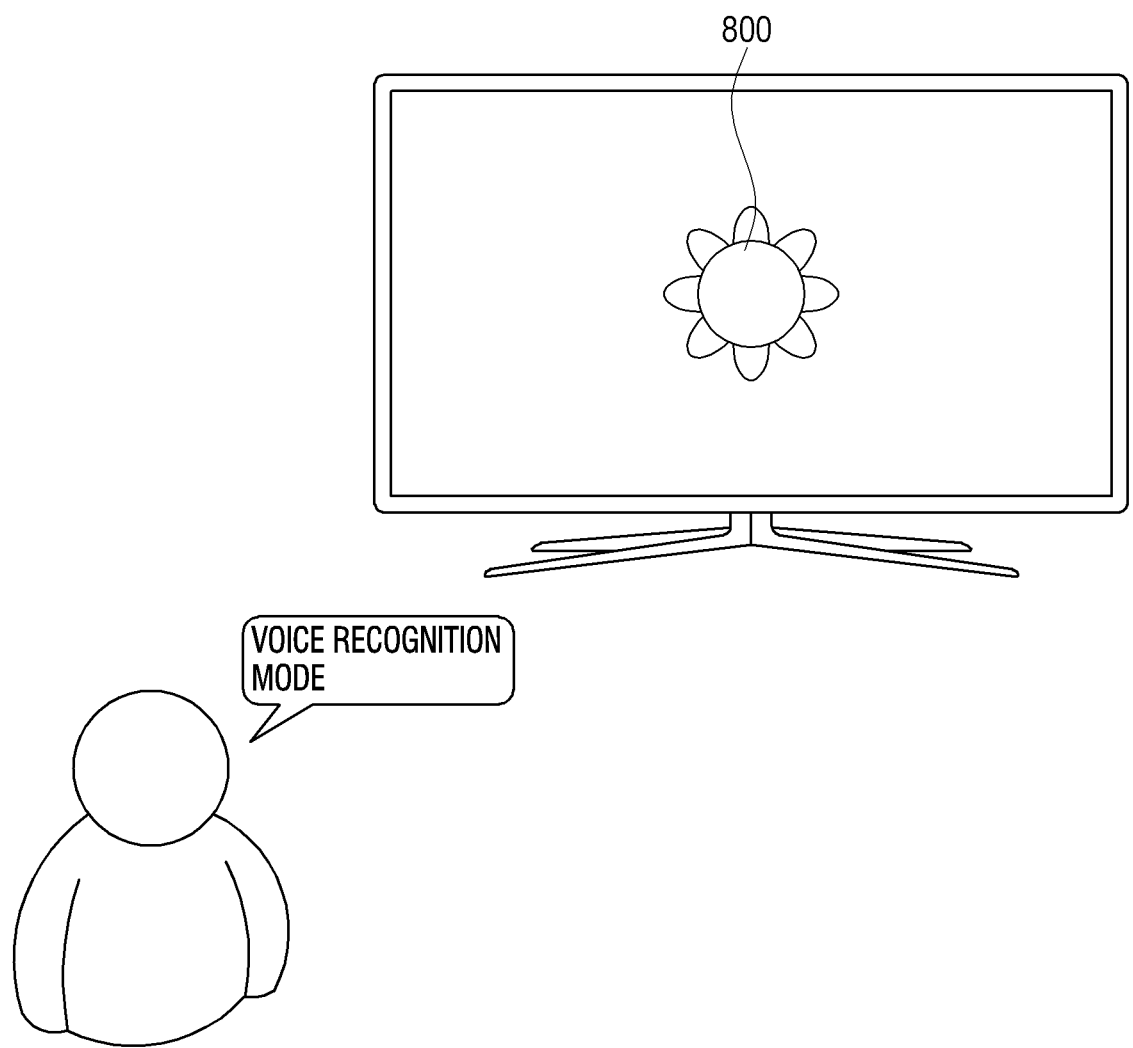
FIG. 8A is a view illustrating a process in which an electronic apparatus recognizes a user voice according to an embodiment.
Figure 8B:
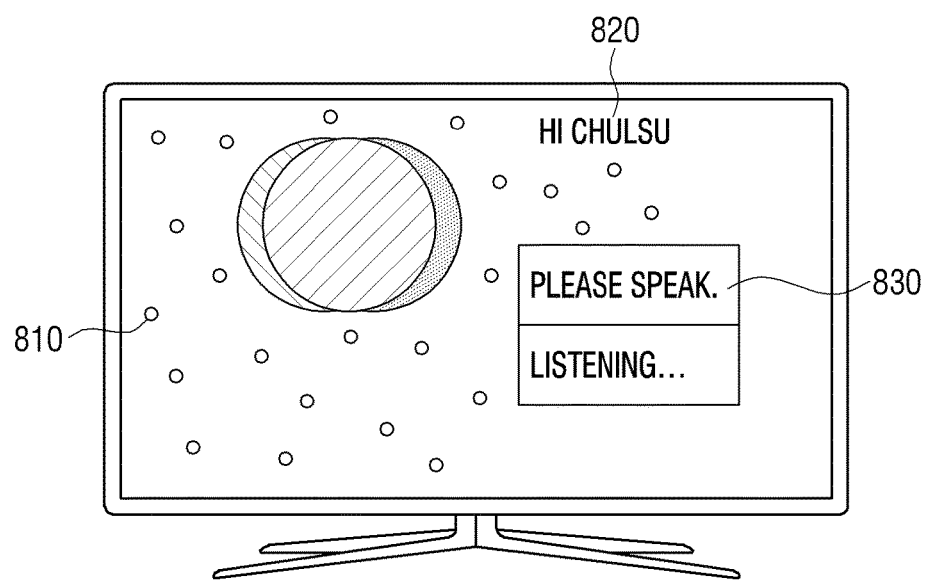
FIG. 8B is a view illustrating a process in which an electronic apparatus recognizes a user voice and switches to a voice recognition mode according to an embodiment.
Figure 8B:
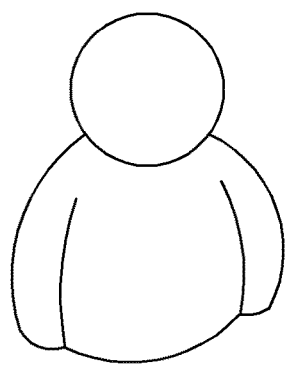
Figure 8C:
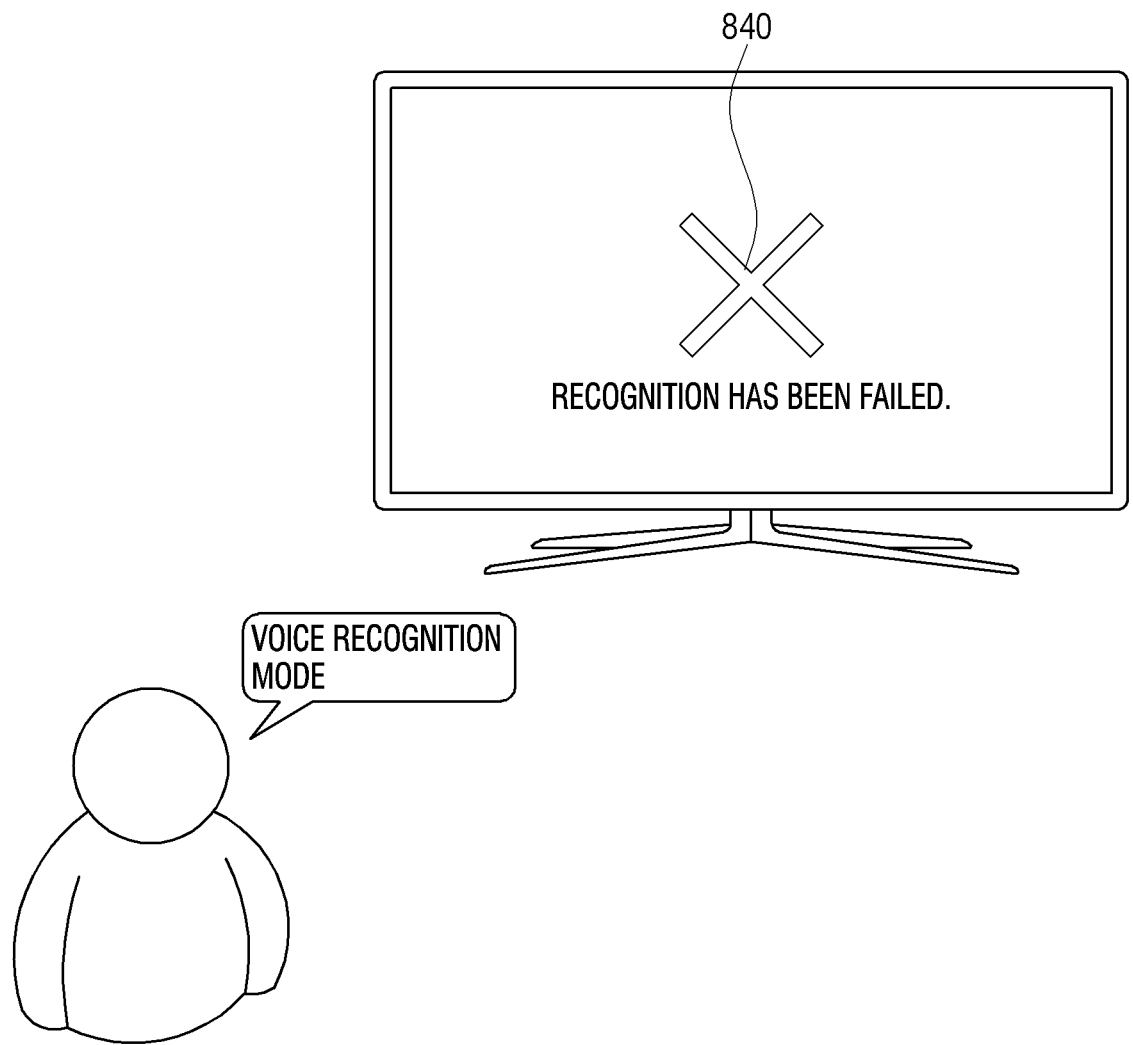
FIG. 8C is a view illustrating a screen displayed when an electronic apparatus fails to recognize a user voice according to an embodiment.

FIGS. 8A to 8C are views illustrating a UI when the electronic apparatus 100 recognizes a user voice and switches to a voice recognition mode or when voice recognition fails, according to an embodiment.

FIG. 8A is an embodiment illustrating a process that the electronic apparatus 100 recognizes a user who has uttered when the user inputs a user voice including text for switching to a voice recognition mode through the voice input unit 110 to the electronic apparatus. Text for switching to the voice recognition mode may be text "voice recognition mode" or a text determined by the user. In an embodiment, when a voice including text for switching to the voice recognition mode called "voice recognition mode" is input from the user, the electronic apparatus 100 may identify whether the uttered user voice matches the pre-registered user voice. Specifically, the electronic apparatus 100 may analyze characteristics of the voice that the user has uttered (e.g., pitch, loudness, and sound quality of the voice) and match an analysis result value with an analysis result value of the pre-registered user voice. When the difference between the characteristics of the uttered user voice and characteristics of the pre-registered user voice does not exceed a threshold value, the electronic apparatus 100 may identify that the user who has uttered voice is a pre-registered user. The electronic apparatus 100 may control the display 130 to display a FIG. 800 while identifying whether the user voice is the pre-registered user voice. The FIG. 800 may be variously changed by the user through the input unit 160, and may be changed to text or a moving image.

FIG. 8B is an electronic apparatus according to an embodiment, and when the electronic apparatus 100 identifies that the voice that the user has uttered matches the pre-registered user voice, that is, when the electronic apparatus 100 recognizes the user uttering the input voice, the electronic apparatus shows a process of switching a mode of the electronic apparatus 100 to the voice recognition mode.

The electronic apparatus 100 may display an indicator corresponding to the user voice indicating that a current mode of the electronic apparatus is the voice recognition mode. And, as an embodiment, in the voice recognition mode, the electronic apparatus 100 may display user information 820 registered together with an indicator corresponding to the user voice (for example, the electronic apparatus 100 may display the text "Hi, Chulsu" or output user information in the form of a voice.) And, the electronic apparatus 100 may display a message 830 requesting a command from the user in the voice recognition mode (for example, "Please speak").

As an embodiment, the electronic apparatus 100 may display a plurality of objects 810 indicating whether a loudness of the user voice is a level that can be detected by the voice input unit 110 in the voice recognition mode. When the electronic apparatus 100 is in the voice recognition mode, the plurality of objects 810 may randomly move on the display 130 at a predetermined speed with a predetermined size. The electronic apparatus 100 may analyze the loudness of the user voice input through the voice input unit 110, and determine sizes and speeds of the plurality of objects 810 in response to the analysis result values. In one embodiment, as a result of analyzing the loudness of the user voice, when the loudness of the user voice does not reach a level that the voice input unit 110 can detect (about 55 db based on the voice input unit), the electronic apparatus 100 may maintain the sizes and speeds of the plurality of objects 810 at predetermined values. Also, when the input user voice gradually increases, that is, when the loudness of the user voice increases, the electronic apparatus 100 may gradually increase the size and increase the speed of the plurality of objects 810. And, when the user voice is increased to a level that the voice input unit 110 can detect (e.g., about 55 dB based on a microphone), the electronic apparatus 100 may return the speed and size of the plurality of objects 810 back to the predetermined speed and size before the user voice is input.

FIG. 8C is a view according to an exemplary embodiment, and illustrates a view when the user who has uttered the voice is not recognized, the electronic apparatus 100 may display text "recognition has failed" together with an indicator 840 transformed into an X mark without switching to voice recognition mode. In other words, when the electronic apparatus 100 fails to recognize the user, a message or a figure corresponding thereto may be displayed. When the electronic apparatus 100 fails to recognize the user, the message or figure displayed corresponding thereto may be variously changed by the user through the input unit 160, and may be displayed in one area or the entire of the display.

In addition, when the user voice recognition fails, the electronic apparatus 100 may display a screen that was displayed before the user voice was input, and display again a UI requesting the user to utter text for switching the voice recognition mode.

Figure 9A:
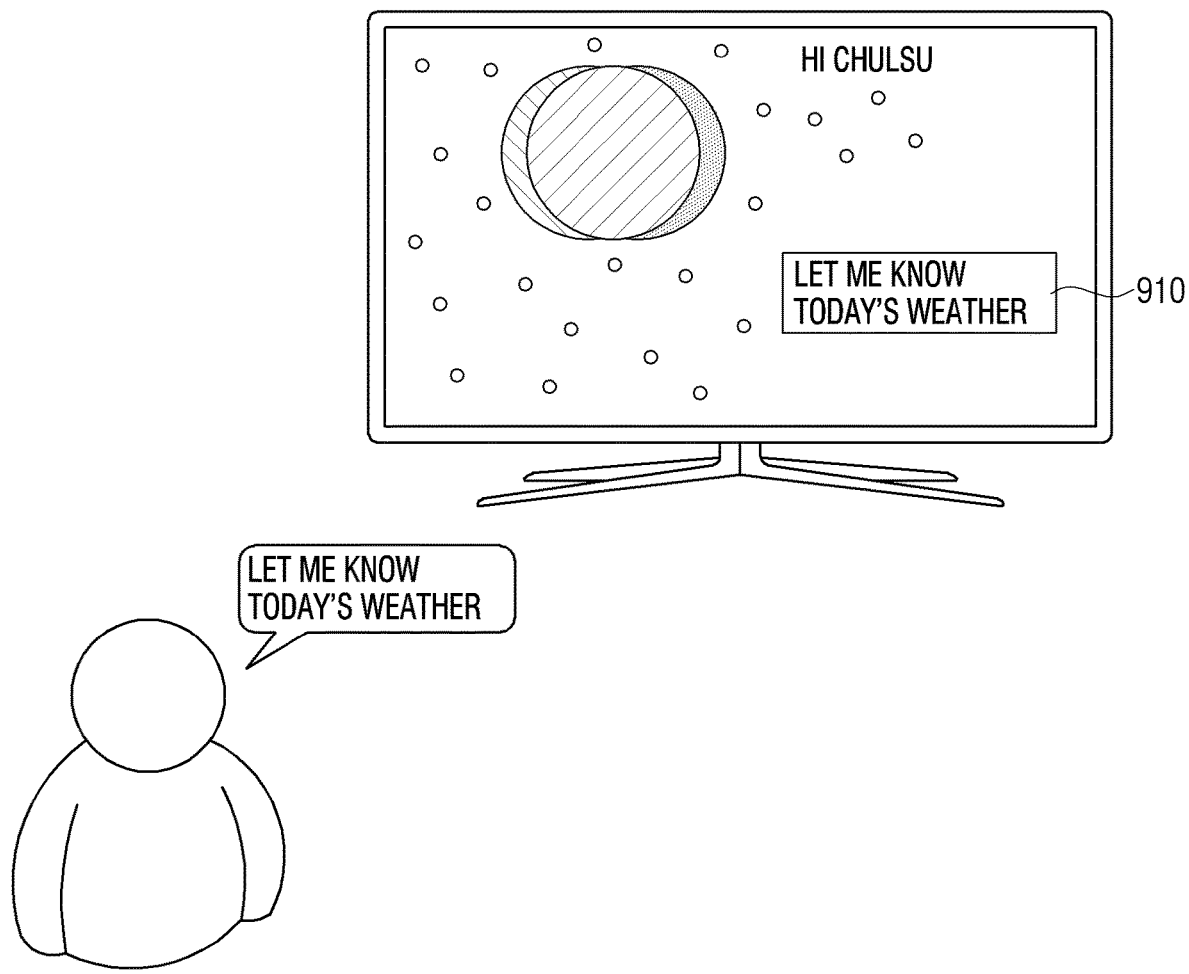
FIG. 9A is a view illustrating a process in which an electronic apparatus receives a user command in a voice recognition mode, according to an embodiment.
Figure 9B:
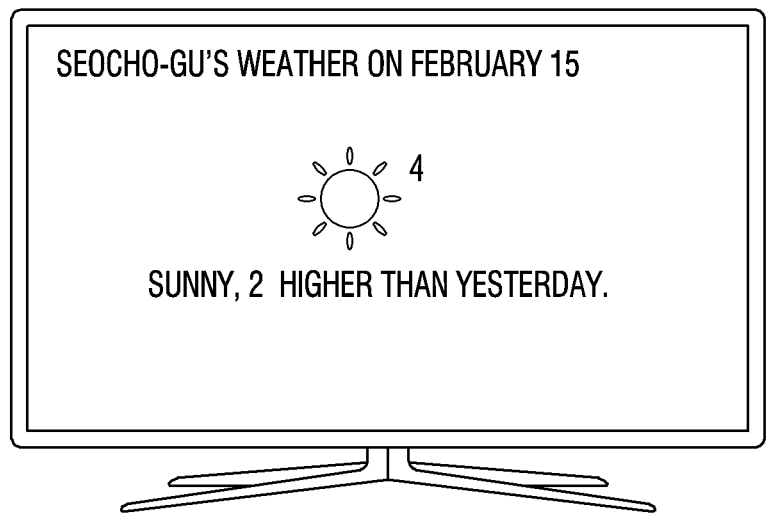
FIG. 9B is a view illustrating a process in which an electronic apparatus performs a command according to a user command in a voice recognition mode, according to an embodiment.
Figure 9C:
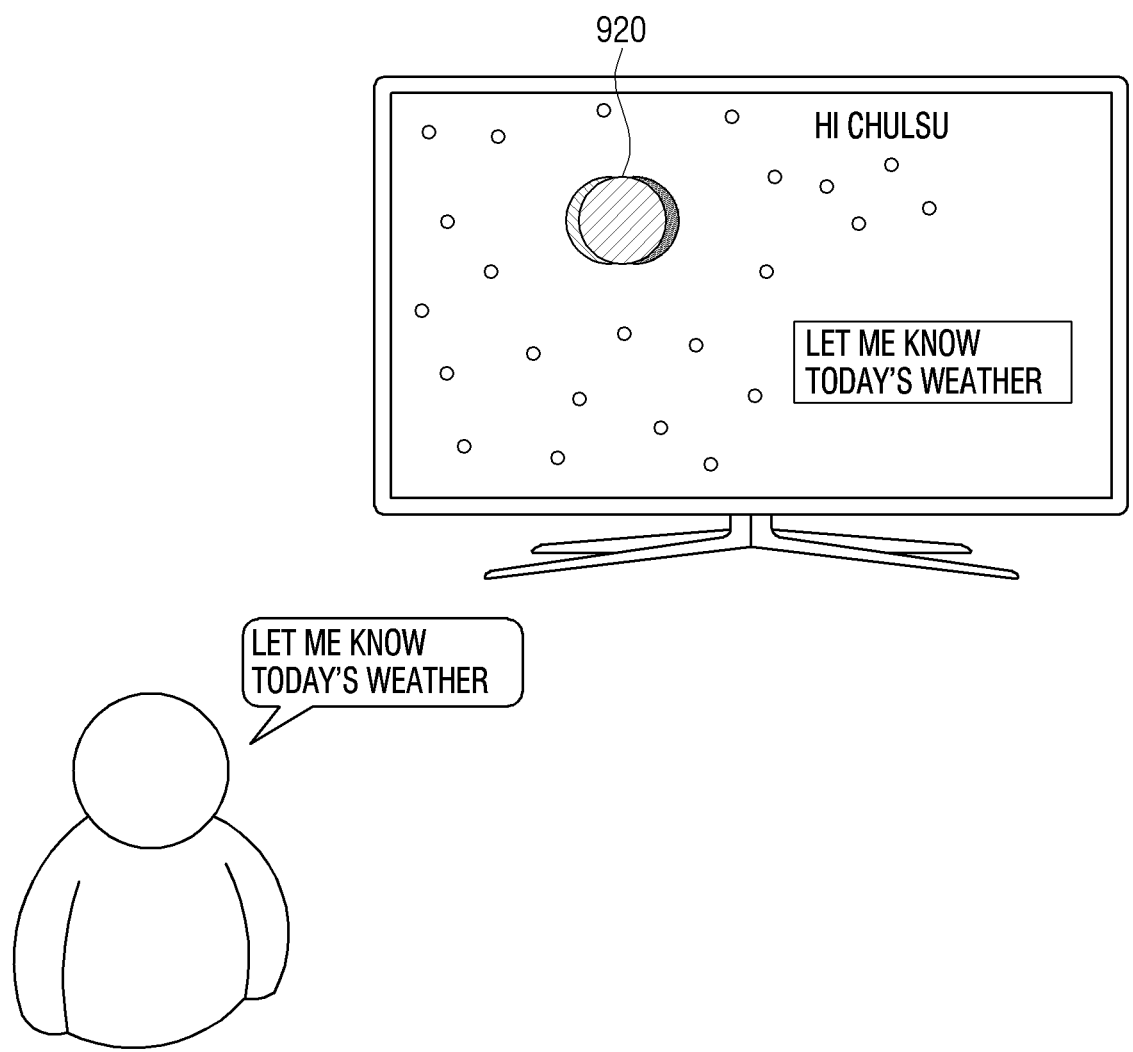
FIG. 9C is a view illustrating a process in which an electronic apparatus changes an indicator by analyzing a user voice in a voice recognition mode, according to an embodiment.

FIGS. 9A to 9C are views illustrating a process in which the electronic apparatus 100 receives and performs a command input from a user in a voice recognition mode and a process of changing an indicator by analyzing the user voice in the voice recognition mode, according to an embodiment.

FIG. 9A a view illustrating a process that when a mode of the electronic apparatus 100 is the voice recognition mode, the electronic apparatus 100 controls a display 130 to display text corresponding to a user voice that has been uttered on the electronic apparatus 100 to identify a user command that has been uttered by the user. According to an embodiment, when the user utters "let me know today's weather", the electronic apparatus 100 controls the display 130 to display the text "let me know todays' weather" together with an indicator corresponding to the user voice. Accordingly, through the electronic apparatus 100, the user may identify whether a command uttered by the user is accurately input into the electronic apparatus 100.

FIG. 9B illustrates a process in which the electronic apparatus 100 performs a command according to a user's utterance in a voice recognition mode. As an embodiment, when a voice command "Let me know today's weather" is input from the user, the electronic apparatus 100 may display information about today's weather. In addition, a screen for performing a function according to a user voice command may be displayed on one area or the entire area of the display 130.

FIG. 9C illustrates a process in which the electronic apparatus 100 analyzes a user voice and changes an indicator based on an analysis result when a mode of the electronic apparatus 100 is the voice recognition mode. The user voice may not always the same and change over time, in the voice recognition mode, the electronic apparatus 100 may analyze a user voice and change the indicator to correspond to the analysis result. In other words, the electronic apparatus 100 may analyze the pitch, loudness, and sound quality of the user voice input during the voice recognition mode, and change at least one of color, size, shape, position, transparency, and movement of a plurality of layers constituting a pre-registered indicator. According to an embodiment, when the electronic apparatus 100 analyzes the user voice inputted in the voice recognition mode, and when analysis values corresponding to the loudness and pitch of the voice are smaller than when the indicator is registered and the analysis value corresponding to the sound quality is different, the electronic apparatus 100 may change the size of the indicator to be small and the color to be different. An indicator 920 illustrated in FIG. 9C is smaller in size than the indicator shown in FIG. 9A and a color of a layer is changed. The electronic apparatus 100 may display the indicator corresponding to the user voice indicating the voice recognition mode as changed.

FIG. 10 is a flowchart illustrating a method for controlling an electronic apparatus according to an embodiment. According to FIG. 10, when the user voice is input, the electronic apparatus 100 may compare the input user voice with a plurality of pre-registered voices (S1010). Specifically, the electronic apparatus 100 may analyze characteristics of the input user voice and compare the characteristics of the analyzed voice with characteristics of the plurality of pre-registered voices. In an embodiment, the electronic apparatus 100 may identify whether a difference between a characteristic of one of the plurality of pre-registered voices and a characteristic of an input user voice exceeds a threshold value. When the difference between the characteristic of the registered voice and the characteristic of the user voice does not exceed the threshold, the electronic apparatus 100 may identify that the inputted user voice and the pre-registered voice match. If it is identified that the input user voice matches one of the plurality of pre-registered voices, the electronic apparatus 100 may recognize the user who has uttered the input user voice (S1020). In addition, the electronic apparatus 100 may control the display to display an indicator corresponding to the recognized user (S1030).

The term "module" as used herein includes units made up of hardware, software, or firmware, and may be used interchangeably with terms such as logic, logic blocks, components, or circuits. A "module" may be an integrally constructed component or a minimum unit or part thereof that performs one or more functions. For example, the module may be configured as an application-specific integrated circuit (ASIC).

According to an embodiment, the various embodiments described above may be implemented as software including instructions stored in a machine-readable storage media which is readable by a machine (e.g., a computer). The device may include the electronic device (e.g., The electronic apparatus 100 may further include an input unit (not illustrated)) according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program module, or other component, according to various exemplary embodiments, may be sequential, parallel, or both, executed iteratively or heuristically, or at least some operations may be performed in a different order, omitted, or other operations may be added.

What is claimed is:

1. An electronic apparatus comprising:
a voice input unit;
a display;
a memory storing at least one instruction; and
a processor configured to execute the at least one instruction to:
  based on a voice of a user being input through the voice input unit, recognize the user who has uttered the voice by comparing the voice with a plurality of pre-registered voices; and
  control the display to display an indicator corresponding to the recognized user, the indicator indicating that a current mode of the electronic apparatus is a voice recognition mode,
wherein a plurality of characteristics of the indicator each correspond to at least one of pitch, loudness, and quality of the voice of the user, the plurality of characteristics of the indicator comprising at least two of color, size, shape, position, transparency, and movement.

2. The electronic apparatus of claim 1,
wherein the processor is further configured to, based on an event for registering the indicator being occurred, control the display to display a user interface (UI) requesting the user to utter,
based on the voice including a command for registering the indicator of the user while the UI requesting an utterance from the user is displayed, analyze the voice for registering the indicator of the user to acquire the indicator corresponding to the voice, and
register information on the user and the indicator and store the information and the indicator in at least one of an external server or the memory.

3. The electronic apparatus of claim 2,
wherein the UI comprises a message requesting the utterance from the user and a text for switching to the voice recognition mode.

4. The electronic apparatus of claim 1,
wherein the pitch and the loudness of the voice are used to determine at least one of the size, the shape, the position, and the movement of the indicator, and
wherein the quality of the voice is used to determine at least one of the color and the transparency of the indicator.

5. The electronic apparatus of claim 1,
wherein the processor is further configured to, based on the voice including a command for switching to the voice recognition mode being input, recognize the user who has uttered the voice, and
based on the user who has uttered the voice being recognized, switch to the voice recognition mode.

6. The electronic apparatus of claim 1,
wherein the processor is further configured to, based on the voice being input through the voice input unit during the voice recognition mode, change the indicator to correspond to an analysis result of the voice.

7. The electronic apparatus of claim 6,
wherein the processor is further configured to change at least one of color, size, shape, position, transparency, and movement of a pre-registered indicator by analyzing the pitch, loudness and quality of the voice input through the voice input unit during the voice recognition mode.

8. The electronic apparatus of claim 7,
wherein the processor is further configured to control the display to display a message requesting a command from the user at a same time as the indicator is registered.

9. A method for controlling an electronic apparatus, the method comprising:
based on a voice of a user being input, recognizing the user who has uttered the voice by comparing the voice with a plurality of pre-registered voices; and
displaying an indicator corresponding to the recognized user, the indicator indicating that a current mode of the electronic apparatus is a voice recognition mode,
wherein a plurality of characteristics of the indicator each respectively correspond to at least one of pitch, loudness, and quality of the voice of the user, the plurality of characteristics of the indicator comprising at least two of color, size, shape, position, transparency, and movement.

10. The method of claim 9,
wherein the registering the indicator comprises, based on an event for registering the indicator being occurred, displaying a user interface (UI) requesting the user to utter;
based on the voice including a command for registering the indicator of the user while the UI requesting an utterance from the user is displayed, analyzing the voice for registering the indicator of the user to acquire the indicator corresponding to the voice; and
registering information on the user and the indicator and store the information and the indicator in at least one of an external server or the memory.

11. The method of claim 10,
wherein the UI comprises a message requesting the utterance from the user and a text for switching to the voice recognition mode.

12. The method of claim 9,
wherein the pitch and the loudness of the voice are used to determine at least one of the size, the shape, the position, and the movement of the indicator, and
wherein the quality of the voice is used to determine at least one of the color and the transparency of the indicator.

* * * * *